Jan. 19, 1926.  1,570,155
V. KARBOWSKI
PIPE CONNECTION
Filed August 9, 1924
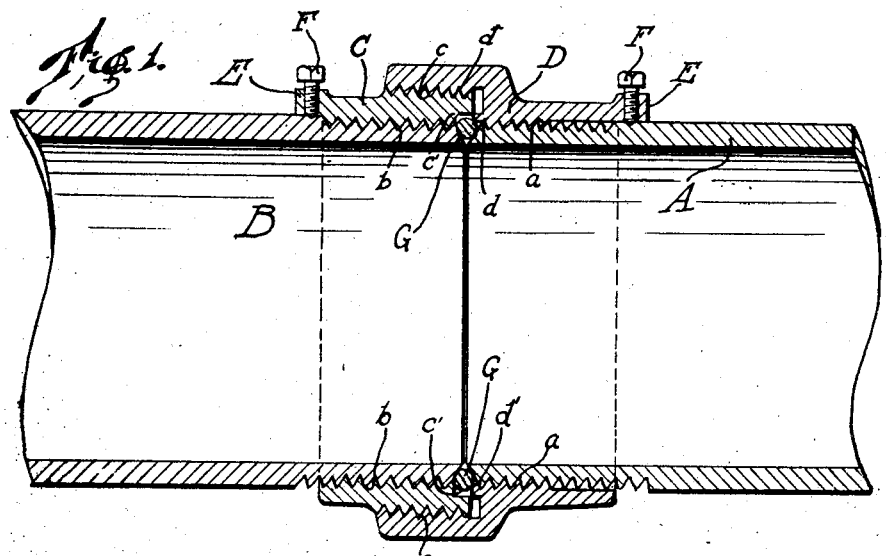
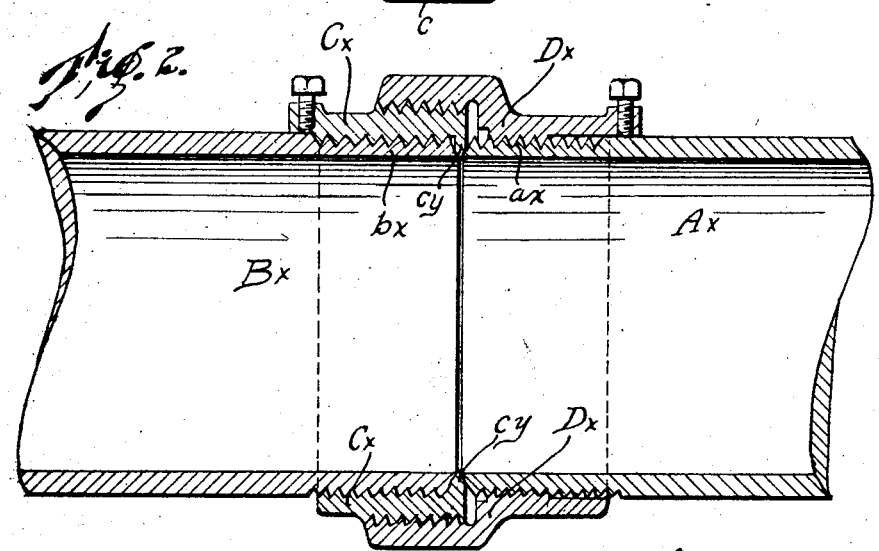
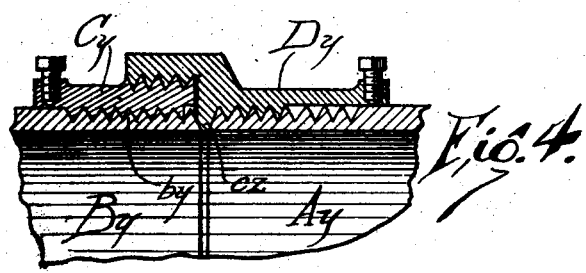
INVENTOR
V. Karbowski
BY
ATTORNEYS Patented Jan. 19, 1926.

1,570,155

UNITED STATES PATENT OFFICE.

VICTOR KARBOWSKI, OF CHICAGO, ILLINOIS, ASSIGNOR OF ONE-HALF TO CHARLES LASKOWSKI, OF BALTIMORE, MARYLAND.

PIPE CONNECTION.

Application filed August 9, 1924 Serial No. 731,114.

*To all whom it may concern:*

Be it known that I, VICTOR KARBOWSKI, a citizen of Poland, and a resident of Chicago, county of Cook, and State of Illinois, have invented a new and useful Improvement in Pipe Connections, of which the following is a full, clear, and exact description.

My invention relates to improvements in pipe connections or unions, and it consists in the combinations, constructions, and arragements herein described and claimed.

An object of my invention is to provide a pipe connection which may be used with pipes having roughly or smoothly cut end sections, so as to positively prevent leakage.

A further object of my invention is to provide a pipe connection of the so-called differential type, that is to say, in which the binding parts are threaded with threads having different pitch from the threads on the pipes so as to draw the ends of the pipes against a metal packing ring or gasket of harder material than the pipe sections themselves, thereby providing a packed joint which does not require tightening from time to time as is the case with joints having gaskets which are of softer material than the sections which they abut.

A further object of my invention is to provide a pipe connection of the type described in which the connecting or disconnecting of the pipe sections may be quickly effected.

A further object of my invention is to provide a pipe connection of the type in which the liability of loosening or creeping or otherwise opening up is positively prevented.

Other objects and advantages will appear in the following specification, and the novel features of the invention will be particularly pointed out in the appended claim.

My invention is illustrated in the accompanying drawings, forming part of this application, in which—

Figure 1 is a central section showing one embodiment of my invention,

Figure 2 is a modified form of the device,

Figure 3 shows a portion of a modified form of gasket or packing ring, and

Figure 4 is a sectional view of another modified form of the device.

In Figure 1 as stated, I have shown one embodiment of my invention. In this figure the two pipe sections A and B are threaded at their ends, as shown at $a$ and $b$ respectively, with standard threads. A sleeve C is provided which, as shown, is threaded internally to engage the threads of the pipe B. A portion of the outer periphery of the sleeve C is provided with threads $c$. A union D is provided which has threads arranged to engage the threads $a$ of the pipe section A and also threads $d$ to engage the threads $c$ of the sleeve C.

The sleeve C is provided with a recess $c^1$ while the union has a shoulder $d^1$. Both the union and the sleeve are provided with extensions E which have threaded openings arranged to receive set screws F.

A packing ring or gasket G is provided, and this is disposed between the ends of the roughly cut pipe sections. This gasket or packing ring is made of harder material than the material of which the pipes are made. The elastic limit of the packing ring is greater than the elastic limit of the metal of the pipe connection.

From the foregoing description of the various parts of the device, the operation thereof may be readily understood. In assembling the device the sleeve C is screwed onto the pipe section B and the union is placed on the end of the pipe section D and turned far enough as to engage the threads. The opposite end of the union is then brought into engagement with the threads $c$ of the sleeve, the gasket having been placed in position, and the union is now turned so as to draw the pipe sections together, thereby clamping the gasket in the position shown in the drawings. The set screws F may now be tightened.

The joint thus formed has a number of advantages. In the first place, it permits the use of standard threads on the pipe section but still has a differential effect through the use of the threads of different pitch on the sleeve and on the union. The main advantage however lies in the use of a hard metal packing ring or gasket. Heretofore metal packing rings or gaskets of soft metal such as lead or copper have been used, but experience has shown that in time such pipe connections have to be tightened. I have found that where a hard metal ring is used, no such adjustment is necessary when a differential connection is used.

The use of set screws tends to prevent any movement of the parts so that the parts are retained in their position.

In Figure 2 I have shown a modified form of the device. In this figure the pipes $A^x$ and $B^x$ have standard threads $a^x$ and $b^x$. The sleeve $C^x$ has a projecting portion $c^y$ which is integral with the sleeve and which serves as a packing ring instead of necessitating an independent or separate ring. It will be observed that in this form of the device, as in the form shown in Figure 1 the union $D^x$ tends to draw the pipe sections together, and the interposed extension $c^y$ is thereby clamped tightly between the ends of the pipes as is the ring G in Figure 1.

Obviously the packing ring or the extension such as that shown at $c^y$ may be of other shapes than those shown in Figures 1 and 2. For instance, in Figure 3 I have shown a portion of a ring G′ of substantially rectangular cross section. This ring could be used with a sleeve and union having recesses arranged to conform to the ring, without departing from the spirit and scope of the invention.

In Figure 4, I have shown still another modified form of the device. This form is identical to that shown in Figure 2, except that the union $D^y$ is provided with an inwardly extending flange $c^z$ which takes the place of the flange $c^y$ and functions in the same manner.

I claim:

A pipe connection comprising a pair of pipe sections each having a standard threaded end, a sleeve arranged to be screwed on the end of one section and having a portion of its exterior surface threaded, a union having a portion threaded internally to engage the end of the other section, and being provided with another portion threaded to engage the exterior threads of said sleeve, said sleeve having an integral inwardly extending annular flange adapted to close the space between the pipe ends, said inwardly extending annular flange being pressed upon by the ends of the pipe sections when the parts are connected, and constituting a packing ring for preventing leakage.

VICTOR KARBOWSKI.